United States Patent
Hirai et al.

(10) Patent No.: US 6,934,601 B2
(45) Date of Patent: Aug. 23, 2005

(54) NUMERICALLY CONTROLLED CURVED SURFACE MACHINING UNIT

(75) Inventors: Junichi Hirai, Hitachi (JP); Hiroshi Arai, Hitachiota (JP); Tamotsu Harihara, Fujisawa (JP); Osamu Chiba, Hitachinaka (JP); Masaaki Takahashi, Hitachi (JP); Nobuhisa Kanamaru, Hitachi (JP)

(73) Assignees: Hitachi, Ltd., Tokyo (JP); Hitachi Software Engineering Co., Ltd., Yokohama (JP)

( * ) Notice: Subject to any disclaimer, the term of this patent is extended or adjusted under 35 U.S.C. 154(b) by 0 days.

(21) Appl. No.: 10/733,318

(22) Filed: Dec. 12, 2003

(65) Prior Publication Data
US 2004/0181307 A1 Sep. 16, 2004

Related U.S. Application Data

(63) Continuation-in-part of application No. 10/437,279, filed on May 14, 2003, now Pat. No. 6,675,061, which is a continuation of application No. 09/791,561, filed on Feb. 26, 2001, now Pat. No. 6,587,747.

(51) Int. Cl.[7] .............................................. G06F 19/00
(52) U.S. Cl. ....................... 700/194; 700/187; 700/193; 318/570
(58) Field of Search ................................. 700/182, 184, 700/186–189, 192–194; 703/1; 318/570–574

(56) References Cited

U.S. PATENT DOCUMENTS

| | | | | |
|---|---|---|---|---|
| 4,639,868 A | * | 1/1987 | Tanaka et al. | ................. 702/9 |
| 5,282,143 A | | 1/1994 | Shirai | |

(Continued)

FOREIGN PATENT DOCUMENTS

| | | |
|---|---|---|
| EP | 0 706 103 A1 | 9/1995 |
| GB | 2 341 243 A | 3/2000 |
| JP | 7-334223 | 12/1995 |
| JP | 9-114512 | 5/1997 |
| JP | 2001-092516 | 4/2001 |

OTHER PUBLICATIONS

"On Nurbs : A Survey", L. Piegl, IEEE Computer Graphics and Applications, IEEE Inc. New York, US, vol. 11, NR, pp. 55–71.

(Continued)

*Primary Examiner*—Leo Picard
*Assistant Examiner*—Sean Shechtman
(74) *Attorney, Agent, or Firm*—Antonelli, Terry, Stout & Kraus, LLP

(57) ABSTRACT

A numerically controlled curved-surface machining unit comprises a component converting matrix·angle-addition value forming function of converting CL (cutter location) data into components on a normal coordinate system on the basis of the machine configuration of the simultaneous multiple-axis control NC machine, a component converting function of converting from the workpiece coordinate system to the normal coordinate system, a function of forming second angles of a second rotary axis on the normal coordinate system, a compensating function of forming a continuous angle distribution from a distribution of the second angles, a function of forming first angles of a first rotary axis on a coordinate system rotated by the second angles at the second rotary axis, a compensating function of forming a continuous angle distribution from a distribution of the first angles, a machine coordinate transformation matrix forming function of obtaining a matrix for converting the tool control point vectors on the workpiece coordinate system into a machine coordinate system by using the first angles and the second angles, and a machine coordinate converting function of converting the tool control point vectors into the machine coordinate system by using the machine coordinate transforming matrix.

5 Claims, 15 Drawing Sheets

U.S. PATENT DOCUMENTS

| | | |
|---|---|---|
| 5,726,896 A | 3/1998 | Jia et al. |
| 5,808,263 A | 9/1998 | Beltrami |
| 5,815,401 A | 9/1998 | Otsuki et al. |
| 5,936,864 A | 8/1999 | Otsuki et al. |
| 5,955,856 A | 9/1999 | Sato et al. |
| 5,994,863 A | 11/1999 | Fujita |
| 6,268,871 B1 | 7/2001 | Rice et al. |
| 6,311,098 B1 | 10/2001 | Higasayama et al. |

OTHER PUBLICATIONS

"Integer Subdivision Algorithm for Rendering Nurbs Curves", N. Anantakrishinan et al, Visual Computer, Springer, Berlin, DE, vol. 8, NR. 3, pp. 149–161.

Mold Engineering Issued Jul. 1998, pp. 8–9.

Machine & Tools Issued Feb. 1998, pp. 12–17.

The Nurbs Book by L. Piegl, et al.

\* cited by examiner

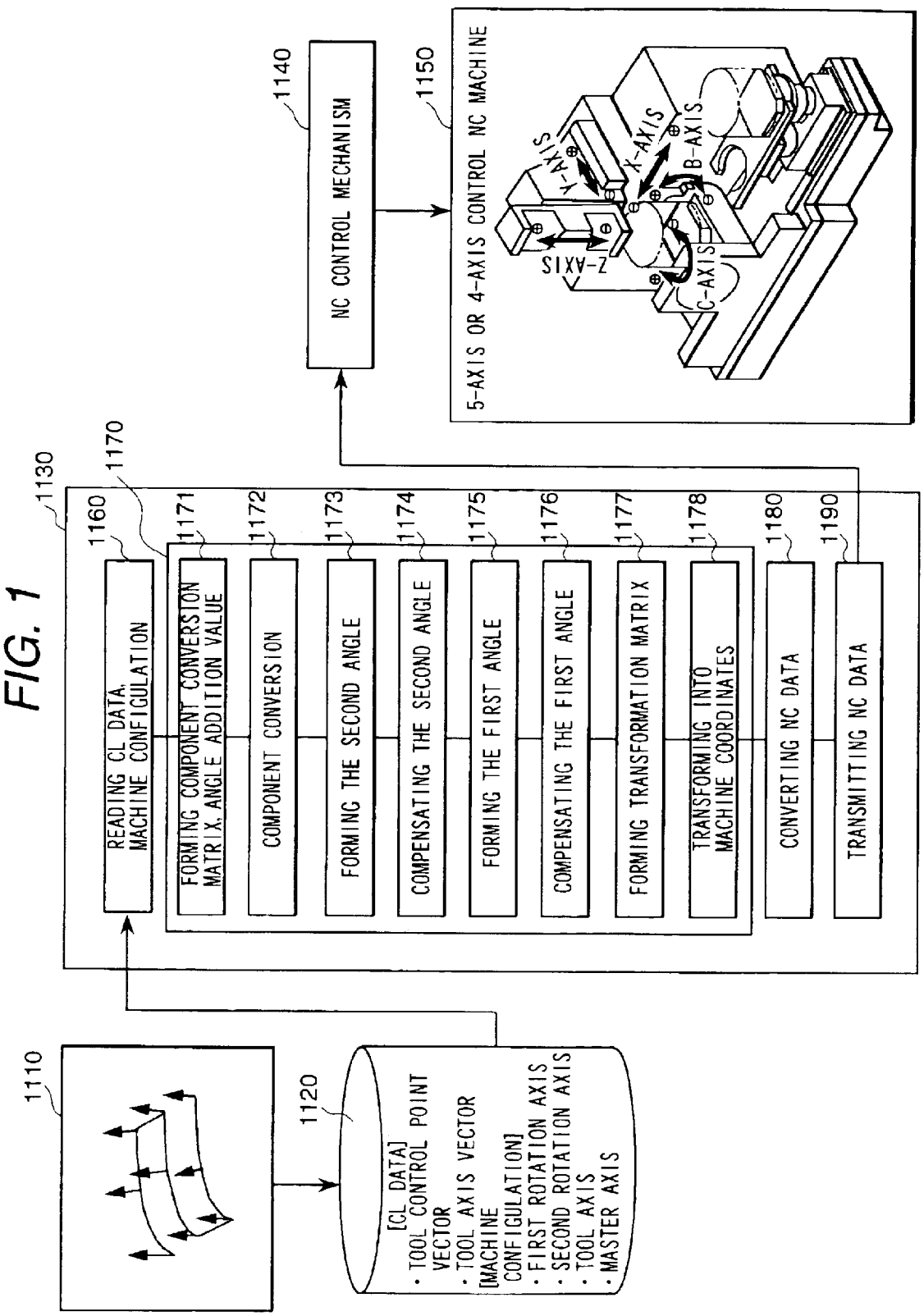

FIG. 2

| MACHINE CONFIGURATION | | | | COMPONENT TRANS-FORMATION MATRIX Ma | AXIS TRANS-FORMATION MATRIX Mc | ANGLE ADDITION VALUE Δ |
|---|---|---|---|---|---|---|
| FIRST ROTATION AXIS | SECOND ROTATION AXIS | TOOL AXIS | MASTER AXIS | | | |
| A | C | Z | NOT DESIGNATED | $\begin{bmatrix} 0 & 0 & 1 & 0 \\ 1 & 0 & 0 & 0 \\ 0 & 1 & 0 & 0 \\ 0 & 0 & 0 & 1 \end{bmatrix}$ | $\begin{bmatrix} 0 & 0 & 1 & 0 \\ 0 & 1 & 0 & 0 \\ 1 & 0 & 0 & 0 \\ 0 & 0 & 0 & 1 \end{bmatrix}$ | 0 |
| B | C | Z | NOT DESIGNATED | $\begin{bmatrix} 0 & 1 & 0 & 0 \\ 0 & 0 & 1 & 0 \\ 1 & 0 & 0 & 0 \\ 0 & 0 & 0 & 1 \end{bmatrix}$ | $\begin{bmatrix} 0 & 1 & 0 & 0 \\ 0 & 0 & 1 & 0 \\ 1 & 0 & 0 & 0 \\ 0 & 0 & 0 & 1 \end{bmatrix}$ | 0 |
| B | A | X | NOT DESIGNATED | $\begin{bmatrix} 0 & 0 & 0 & 1 \\ 0 & 0 & -1 & 0 \\ 0 & 1 & 0 & 0 \\ 0 & 0 & 0 & 1 \end{bmatrix}$ | $\begin{bmatrix} 0 & 0 & 0 & 1 \\ 0 & 0 & 1 & 0 \\ 0 & 1 & 0 & 0 \\ 1 & 0 & 0 & 0 \end{bmatrix}$ | 0 |
| A | B | Z | B | $\begin{bmatrix} 0 & 0 & 0 & 1 \\ 0 & 0 & 1 & 0 \\ 0 & 1 & 0 & 0 \\ 1 & 0 & 0 & 0 \end{bmatrix}$ | $\begin{bmatrix} 0 & 0 & 0 & 1 \\ 0 & 1 & 0 & 0 \\ 0 & 0 & 1 & 0 \\ 1 & 0 & 0 & 0 \end{bmatrix}$ | $\dfrac{\pi}{2}$ |
| B | A | Z | A | $\begin{bmatrix} 0 & 0 & 0 & 1 \\ 0 & 1 & 0 & 0 \\ 0 & 0 & -1 & 0 \\ -1 & 0 & 0 & 0 \end{bmatrix}$ | $\begin{bmatrix} 0 & 0 & 0 & 1 \\ 0 & 1 & 0 & 0 \\ 0 & 0 & 1 & 0 \\ 1 & 0 & 0 & 0 \end{bmatrix}$ | $\dfrac{\pi}{2}$ |

1210

IT CAN BE JUDGED TO BE BENT FROM BEHAVIOR OF LINEAR AXES

BEHAVIOR OF LINEAR AXES IN MACHINE COORDINATES

FILET INSERTION IN EXPRESSION BY CONVERSION INTO ROTARY COORDINATE SYSTEM

NURBS CURVE FORMED FROM NURBS CONTROL POINTS $P_0 \sim P_n$

FIG. 13
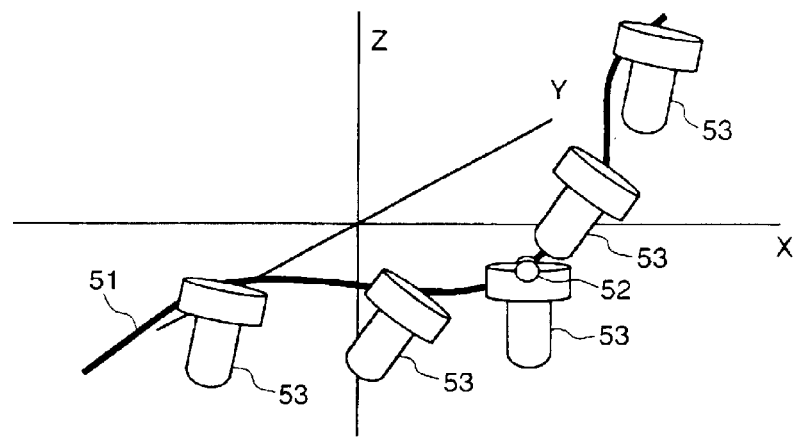
BEHAVIOR OF LINEAR COORDINATE
AXES IN MACHINE COORDINATES
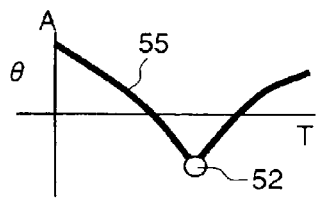
A-AXIS
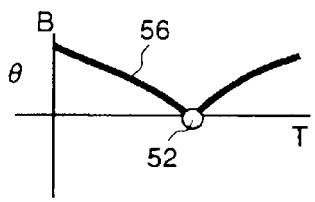
B-AXIS
BEHAVIOR OF ROTARY AXES
IN MACHINE COORDINATES
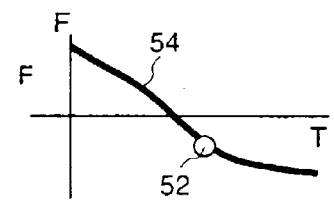
FEED RATE
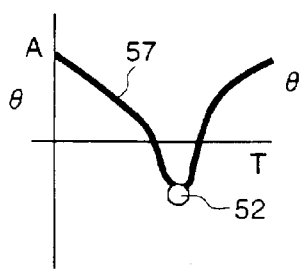
A-AXIS
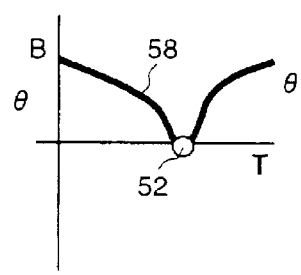
B-AXIS
BEHAVIOR OF ROTARY AXES
IMPROVED IN RAPID CHANGE

NUMERICALLY CONTROLLED CURVED SURFACE MACHINING UNIT

CROSS REFERENCE TO THE RELATED APPLICATION

This is a Continuation-in-Part Application of U.S. patent application Ser. No. 10/437,279 filed May 14, 2003, now U.S. Pat. No. 6,675,061, which is a continuation application of U.S. patent application Ser. No. 09/791,561 filed Feb. 26, 2001, which is now patented as U.S. Pat. No. 6,587,747 B2.

BACKGROUND OF THE INVENTION

1. Field of Utilization in Industry

The present invention relates to a numerically controlled curved surface machining unit and, particularly to such a unit that improves machining surface roughness and accuracy and enables to achieve high-speed machining.

2. Description of Prior Art

FIG. 10 shows comparison between a conventional linear interpolation machining method and a conventional NURBS interpolation machining method.

In conventional NC (numerically controlled) curved-surface machining, as shown in FIG. 10(a), it is machined by broken-line approximation, so that the machined surface roughness is bad and a lot of hand-finishing steps are needed thereafter. Further, as shown in FIG. 10(b), by acceleration/deceleration when positioning, an average feed rate decreases, as a result, a long machining time is needed, further, a vast amount of NC (numerical control) data at shorter pitches are required to improve the machining surface accuracy.

Then, for the purpose of improvement of the machined surface accuracy and reduction of the NC data, various curved-surface machining methods by the NC (numerically controlled) machine are proposed. However, even if in those conventional methods, there have been still left problems of reduction in machined surface roughness by the broken-line approximation and decrease in average feed rate by acceleration/deceleration when positioning.

FIG. 11 shows the relationship between a NURBS curve and control points.

In order to solve those problems, an interpolation method by a NURBS (Non-Uniform Rational B-Spline) curve, that is, a non-uniform rational B-spline curve is proposed. The NURBS curve is a kind of B-spline curve, and it is a curve which is non-uniform in distances between knots forming the curve and expressed by using a rational expression. The NURBS curve is characterized by being expressed by rational expression to define the curve, while the other curves are expressed by using polynomial expression.

By controlling the rational formulas, it is possible to locally and easily deform the curve. Further, it is possible to deal consistently with a circular cylinder, circular cone, sphere, hyperbolic curve and parabola which can not be precisely expressed by using the other curves.

In FIG. 11, a NURBS curve defines a curve by the control points Pi, weights wi and knot vectors xi. In the symbols used hereunder, k is degree, Pi is control point, wi is weights, xi is knot (xi≦xi+1), [x0, x1, . . . , xm] (m=n+k) is knot vector, and t is spline parameter.

A spline basis function N(t) is expressed by a de Boor-Cox recursive expression, as by Expressions 1 and 2. An interpolating NURBS curve P(t) is expressed as by Expression 3.

$$N_{i,1}(t) = \begin{cases} 1 & (x_i \le t \le x_{i+1}) \\ 0 & (t < x_i, x_{i+1} < t) \end{cases} \quad \text{Expression 1}$$

$$N_{i,k}(t) = \frac{(t-x_i)N_{i,k-1}(t)}{x_{i+k-1}-x_i} + \frac{(x_{i+k}-t)N_{i+1,k-1}(t)}{x_{i+k}-x_{i+1}} \quad \text{Expression 2}$$

$$P(t) = \frac{\sum_{i=0}^{n} N_{i,k}(t)w_i P_i}{\sum_{i=0}^{n} N_{i,k}(t)w_i} \quad (x0 \le t \le xm) \quad \text{Expression 3}$$

A NURBS interpolation instruction is outputted in the following format.

```
G05P10000; (high-accuracy continuous contour control mode ON)
...
G06.2
[P___] K___X_Y_Z_α_β_[R_][F_];
K_X_Y_Z_α_β_[R_];
K_X_Y_Z_α_β_[R_];
K_X_Y_Z_α_β_[R_];
...
K_X_Y_Z_α_β_[R_];
K_;
...
K_;
G01 . . .
...
G05P0; (high-accuracy continuous contour control mode OFF)
``` where; each code has the following meaning:
G06.2: NURBS interpolation mode ON
P: Degree of NURBS curve
K_X_Y_Z_α_β_: Control point (α, β: Rotary axis instruction)
R: Weights
K: Knot
F: Feed rate.

In the NURBS interpolation machining, as shown in FIG. 10(c), since a curve can be machined smoothly, hand-finishing steps are less. Further, as shown in FIG. 10(d), acceleration/deceleration when positioning becomes smooth, whereby the average feed rate increases, so that the machining time can be shortened and high-speed machining is possible. Further, since it is possible to set effectively control points of NURBS interpolation, it is said that it has the advantage that NC data become less.

The present applicant proposes the method of reading CL (cutter location data from a CAM system and forming a NURBS curve NC data of a tool moving path, in the U.S. application Ser. No 10/437,279 or JP 2001-92516 A, for example. Further, a method forming the above-mentioned NURBS curve NC data by making quantities of change in feed rate into a curve is proposed by the applicant. Still further, a method of machining a material at high precision and high efficiency from two tool paths is proposed.

A NC post processor unit corresponding to a conventional simultaneous multi-axis control NC machine reads CL data composed of tool control point (tip position) vectors and tool axis (spindle direction) vectors calculated along a machining path direction in the workpiece coordinates defined by a CAM system, and a machine configuration of the simultaneous multi-axis control NC machine, and transforms them a three linear axes coordinates and a rotary angle in the machine coordinate system in order to operate the NC machine.

This transformation is performed in the following three steps, generally:

Step 1: reading CL data composed of the tool length, tool control point vector and tool axis vector, and machine configuration composed of a first rotary axis, a second rotary axis, a tool axis and master axis, of the machine;

Step 2; converting the tool axis vectors into rotation angles according to the machine configuration; and Step 3: converting the tool control point vectors into the three linear axes direction of the machine according to the tool length and tool axis vectors.

As for the rotation angle conversion in the step 2, the following 5 patterns of typical machine configuration of a 5 axes control NC machine which is a kind of the simultaneous multi-axis control NC machine and a angle conversion method of converting into angles from direction vectors are disclosed, for example, in JP 7-334223 A (pages 3 to 5, FIGS. 3 to 11):

(1) Basic 3 axes=X, Y, Z axes,
  2 axes of rotary axes=A, C axes,
  tool axis=A axis;
(2) Basic 3 axes=X, Y, Z axes,
  2 axes of rotary axes=B, C axes,
  tool axis=A axis;
(3) Basic 3 axes=X, Y, Z axes,
  2 axes of rotary axes=A, B axes,
  tool axis=X axis;
(4) Basic 3 axes=X, Y, Z axes,
  2 axes of rotary axes=A, B axes
  (B axis is a master axis),
  tool axis=Z axis;
(5) Basic 3 axes=X, Y, Z axes,
  2 axes of rotary axes=A, B axes
  (A axis is a master axis),
  tool axis=Z axis.

In the patterns (1) to (5), the tool axis vector is expressed as follows when expressing by using (I, J, K):

$$A = \tan^{-1}\left(\frac{\sqrt{I^2+J^2}}{K}\right) \quad C = \tan^{-1}\left(\frac{I}{-J}\right) \quad \text{Expression 4}$$

$$B = \tan^{-1}\left(\frac{\sqrt{I^2+J^2}}{K}\right) \quad C = \tan^{-1}\left(\frac{J}{I}\right) \quad \text{Expression 5}$$

$$A = \tan^{-1}\left(\frac{J}{-K}\right) \quad B = \tan^{-1}\left(\frac{\sqrt{J^2+K^2}}{I}\right) \quad \text{Expression 6}$$

$$A = \tan^{-1}\left(\frac{-J}{\sqrt{I^2+K^2}}\right) \quad B = \tan^{-1}\left(\frac{I}{K}\right) \quad \text{Expression 7}$$

$$A = \tan^{-1}\left(\frac{-J}{K}\right) \quad B = \tan^{-1}\left(\frac{I}{\sqrt{J^2+K^2}}\right) \quad \text{Expression 8}$$

Further, the tool axis vector inputted in the step 1 is set so that the 2nd power sum is 1 or constant, as shown by Expression 9. Here, if the constant value is set to the 2nd power of the tool length, it is not needed to input the tool length in the step 2. In the other words, Expression 9 expresses points on a sphere the radius of which is 1 or constant.

$$I^2+J^2+K^2=1 \text{(or constant)} \quad \text{Expression 9}$$

SUMMARY OF THE INVENTION

In a method of deriving a format of the above-mentioned NURBS interpolation instruction and vectors, weights and knot values at control points, that are to be given to the format and controlling the numerically controlled curved-surface machining unit, and in a method of deriving an optimum value of feed rate to be given to the NURBS interpolation instruction and converting it into NC data, two NURBS curves are interpolated taking into consideration a sharp bend in behavior of the tool control point.

However, any analysis about whether the sharp bend in tool control point behavior is caused by an operation due to NC data on the linear coordinate axes or operation on the rotary coordinate axis has not been conducted and there was no means for changing smoothly the two NURBS curves.

FIG. 12 shows a connection portion of 2 NURBS curves. Generally, the continuity between two curves is calculated and evaluated by information of control points at the connection portion of the NURBS curves. The two NURBS curves to be evaluated of continuity thereof are a curve (CV1) 41 and a curve (CV2) 42.

Control point information of the NURBS curve CV1 is CP1 (1)-CP1 (n) 43, and control point information of the NURBS curve CV2 is CP2 (1)-CP2 (m) 44. As for the continuity of the NURBS curves CV1 and CV2, when the final control point CP1(n) of the NURBS curve CV1 and the first control point CP2 (1) of the NURBS curve CV2 are the same coordinate, it is judged to be no breakpoint between the curves CV1 and CV2.

In the case where this condition is satisfied, when CP1 (n) and CP2 (1) are on a straight line formed by CP1 (n−1) and CP2 (2), it can be judged to satisfy the continuity of a tangential line.

When a point (EXP1) 45 on a straight line defined by CP1 (n−2) and CP1 (n−1) and a point (EXP2) 46 on a straight line defined by CP2 (2) and CP2 (3) satisfy Expression 10 and the point (EXP1) 45 and the point (EXP2) 46 are the same point, the continuity of curvature is kept.

$$|CP1(n-2)-CP1(n-1)|:|CP1(n-1)-EXP1|=|CP1(n-1)-CP1(n)|:|CP2(1)-CP2(2)|=|EXP2-CP2(2)|:|CP2(2)-CP2(3)|$$

FIG. 13 shows behavior of rotary axes on the machine coordinate system, adapting Expression 10, etc. only for movement on linear coordinates of XYZ on the machine coordinate system, and derived taking into consideration only the continuity of feed rate.

A locus 51 is a locus or path for real machining by a NURBS instruction derived taking into consideration only the above mentioned linear coordinate system and the continuity of feed rate. A breakpoint 52 is a breakpoint of segment of a NURBS curve. A behavior 53 is a behavior of a tool on the real machining locus. A distribution 54 is a distribution of feed rates corresponding to the real tool locus 51. A distribution 55 is a distribution of A-axis movement corresponding to the real tool locus 51. 56 denotes a distribution of B-axis movement corresponding to the real tool locus 51. In this example, the tool for a material to be machined is to be controlled, accompanied by rapid inversion operation of the rotary axis of the tool relative to the material at the breakpoint.

FIG. 14 shows cutting into a material at a position at which a rapid change in rotation angle occurs.

In the NC data by NURBS interpolation instruction, when a rotary axis rapidly reverses, stopping accuracy at a designated angle becomes bad by a rapid load change in a servo mechanism. As shown in FIG. 14, even if the tool locus is linear in the machine coordinate system 61, the movement of the tool control point has come to be a movement indicated by numeral 62 in the case where there is such a rapid reverse movement in the rotary axis, as shown by the distributions 55 and 56 in FIG. 13.

As a result, the tool control point 64 in a tool attitude 63 to be required at a reversing position of the rotary axis becomes really a tool control point 66 in a tool attitude 65 by a rapid load change of the servo mechanism, which results in worsening in cutting into the material to be machined and/or machined surface roughness, shortening in machine tool life, and excessive burden on the numerically controlled curved-surface machining unit.

Further, in the case where an angle converting system using any of Expression 4 to Expression 8 is installed in the computer, in some cases angle discontinuity occurs due to limitation of a built in function prepared with computer languages C++, etc and because a root of the sum of the second power of numerators or denominators of Expression 4 to Expression 8 becomes positive.

For example, in the case where an a tan 2 is used for obtaining an arctangent by using C++ as computer languages, there is the following limit:

(A) an arctangent of 0/0 is 0;
(B) an answer range is from $-\pi$ radian to $\pi$ radian; and
(C) a quadrant is determined by a sign of plus or minus of numerator and denominator.

FIGS. 15*a*, 15*b* and 15*c* show a defect by 0/0 in the computer installation.

By the above-mentioned limit of (A), when a tool path passing through a maximum position 1501 of a Z coordinate of a sphere shown in FIG. 15*a* and having a normal line vector as a tool axis vector is inputted, both vector components for obtaining an angle at a position 1502 shown in FIG. 15*b* become 0. Thereby, the angle is calculated to be 0, and a sharp point 1503 as shown in FIG. 15*c* is formed to become a bad angle distribution 1504. A good angle distribution 1505 is a desired result.

FIGS. 16*a*, 16*b* and 16*c* show a defect by the limit of answer range of $-\pi$ radian to $\pi$ radian on computer installation.

By the above-mentioned limit (B), when a tool path 1601 for machining a sphere in a spiral shape with a normal line vector of the sphere as a tool axis vector as shown in FIG. 16*a* for instance, a bad angle distribution 1604 changing in a tooth shape from $-\pi$ radian to a radian as shown in FIG. 16*c* irrespective of continuous changing of tool axis vector 1602 as shown in FIG. 16*b* is formed to be the bad angle distribution 1604. A good angle distribution 1605 is a desired result.

FIGS. 17*a*, 17*b* and 17*c* show a defect due to inversion of vector components.

By the above-mentioned limit (C), a tool path 1701 for machining a sphere so as to pass through the maximum position of the Z coordinate of the sphere with a normal line vector of the sphere as a tool axis vector as shown in FIG. 17*a* for instance is inputted, the tool axis vectors 1702 and 1703 sandwiching the maximum position of a Z axis of the sphere are reversed as shown in FIG. 17*b*, and a bad angle distribution 1704 changing by $\pi$ on the way as shown in FIG. 17*c* is formed.

Further, when forming a root of the sum of the 2nd power of two components like the denominators or numerators of Expression 4 to Expression 8, it becomes only positive number, so that an angle decreases as a bad angle distribution 1705 after discrimination of the quadrant in the above-mentioned limit (C), as a result, it becomes the bad angle distributions 1704 and 1705. A good angle distribution 1706 is a desired result.

When machining is carried out by sending angles formed in a conventional method to a controller of a machining unit without compensating or modifying, such a phenomenon that each axis rotates rapidly at a high speed, a tool moves to an unintended position, or the like occurs, whereby tool breakage, machining unit breakage, too much cutting or too less cutting occurs.

An object of the present invention is to provide a numerically controlled curved-surface machining unit which is provided with means for making no rapid angle change of an rotary axis and making the angle change smooth when NC data is formed by NURBS interpolation based on a tool moving locus or path of CL data produced in a CAM system.

The present invention, to attain the above-mentioned object, provides a numerically controlled curved-surface machining unit equipped with three linearly moving axes and, at least, one rotary axis, including a simultaneous multiple-axis control NC machine numerically controlled by a numerical control unit with a numerical control NURBS interpolation function, which numerically controlled curved-surface machining unit comprises component converting matrix·angle-addition value forming means for converting CL (cutter location) data composed of tool control point vector data and tool axis vector data, calculated along a machining direction on a workpiece coordinate system on which a curved surface is defined by a host computer into components on a normal coordinate system for operating the simultaneous multiple-axis control NC machine on the basis of the machine configuration of the simultaneous multiple-axis control NC machine; component converting means for converting from the workpiece coordinate system to the normal coordinate system; second angle forming means for forming second angles of a second rotary axis on the normal coordinate system; second angle compensating means for forming a continuous angle distribution from a distribution of the second angles; first angle forming means for forming first angles of a first rotary axis on a coordinate system rotated by the second angles at the second rotary axis; first angle compensating means for forming a continuous angle distribution from a distribution of the first angles; machine coordinate transformation matrix forming means for obtaining a matrix for converting the tool control point vectors on the workpiece coordinate system into a machine coordinate system by using the first angles and the second angles; machine coordinate converting means for converting the tool control point vectors into the machine coordinate system by using the machine coordinate transforming matrix; means for converting data on the machine coordinate system to NC data; and means for transmitting the NC data to the numerical control unit.

The invention further provides a numerically controlled curved-surface machining unit equipped with three linearly moving axes and, at least, one rotary axis, including a simultaneous multiple-axis control NC machine numerically controlled by a numerical control unit with a numerical control NURBS interpolation function, which numerically controlled curved-surface machining unit comprises: means for reading, as CL (cutter location) data, tool control point vector data and tool axis vector data, calculated along a machining direction on a workpiece coordinate system on which a curved surface is defined by a host computer, and feed rates on the workpiece coordinate system, and converting the CL data into position vectors of three linear axes on a machine coordinate system, rotation angles and feed rates on the machine coordinate system to operate the simultaneous multiple-axis control NC machine on the basis of the machine configuration of the simultaneous multiple-axis control NC machine; means for forming at least one NURBS curve having continuos curvature by compensating a NURBS curve or adding thereto a NURBS curve so that rotation angles change continuously at the connecting portions of a plurality of NC data that the position vectors and the rotation angles on the machine coordinate system are interpolated by NURBS curve; means for calculating knot vectors of an optimum distance of the NURBS curve on the basis of the position vectors of three linear axes and rotation angles, calculated on the machine coordinate system; means for calculating each of the three linear axes on the machine coordinate system and a NURBS curve of the rotary axis by using the knot vectors; means for converting the NURBS curve into NC data for NURBS interpolation; means for converting feed rates on the workpiece coordinate system into feed rates on the machine coordinate system; means for converting the data on the machine coordinate system into NC data; and means for transmitting the obtained NC data to the numerical control unit.

According to the present invention, it is possible to reduce not only a rapid change in an optimum real feed rate and behavior of a tool (or tool tip) in a tool movement locus drawing a free curve, but a rapid change of behavior on linear (or straight) axes coordinates and rotary coordinates of a machine coordinate system, so that it is possible to perform extension of machining tool life, reduction of a rapid load change in a servo mechanism, reduction of burden on the numerically controlled curved-surface machining unit, improvement on roughness of machined surfaces and machining of curved-surfaces at high machined surface accuracy. As a result, hand-finishing man-hours in after procedures can be greatly reduced.

BRIEF DESCRIPTION OF THE DRAWINGS

FIG. 1 is a block diagram showing the system configuration of an embodiment of a numerically controlled curved surface machining unit according to the present invention;

FIG. 2 is a chart of corresponding relations of machine configurations, component transformation matrix Ma, axis transformation matrix Mc and angle addition vales $\Delta$;

FIG. 13 is a diagram showing behavior of machine coordinate system linear axes, taking into consideration only the continuity of feed rate;

DESCRIPTION OF EMBODIMENTS OF THE INVENTION

Figure 3:
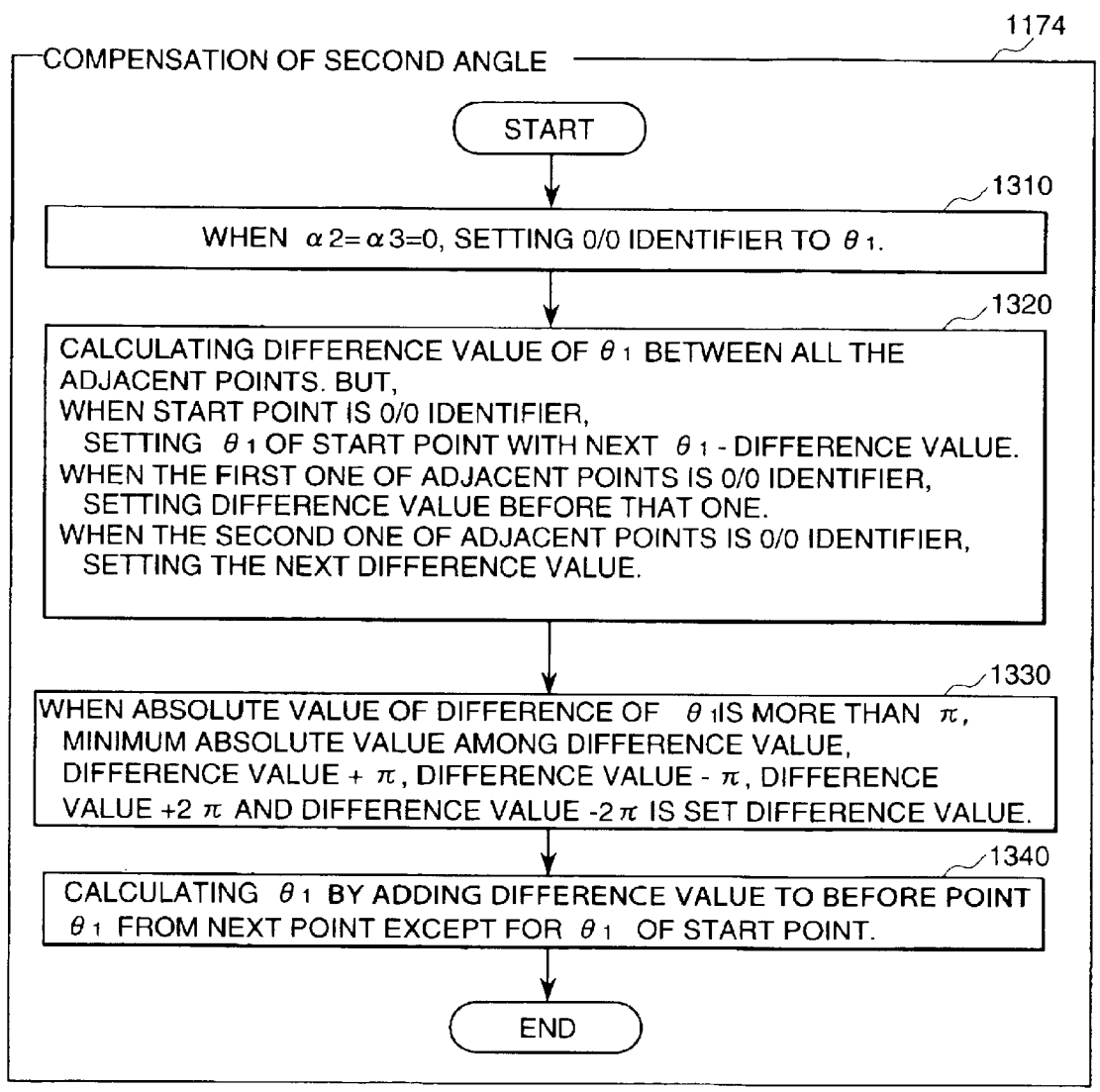
FIG. 3 is a flow chart of compensation procedures for compensating the second angle from angles calculated by a second angle forming means, taking into consideration limit items on computer installation.

Embodiments of a numerically controlled curved-surface machining unit of the present invention will be described hereunder, referring to the drawings.

FIG. 1 shows the system configuration of a first embodiment of a numerically controlled curved surface machining unit according to the present invention. More concretely, it show a configuration of NC host processor unit 1130 according to the present invention.

A CAM system 1110 working in a host computer uses CAD data of a finished shape defined by the CAD system, etc., forms CL (cutter location) data for a multi-axis controlled curved-surface machining unit 1150 (hereunder simply referred to as NC machine) and stores them in a CL data file 1120.

The CL data are composed of tool control point vectors (vectors of tool tip position, for example) and tool axis vectors (tool axis direction vectors, for example) and formed in a workpiece coordinate system defined by the CAM system. A configuration of the machine is expressed by character signs indicating a first rotary axis, second rotary axis, tool axis and master axis, of the NC machine 1150.

The NC post processor unit 1130 is composed of a reading means 1160 for reading the CL data from the CL data file formed by the host CAM system 1110, and the machine configuration, a machine coordinate transforming means 1170, a NC data converting means 1180 and a NC data transmitting means 1190.

Further, the machine coordinate transforming means 1170 is composed of a component transforming matrix·angle-addition value forming means 1171, a component converting means 1172, a second angle forming means 1173, a second angle compensating means 1174, a first angle forming means 1175, a first angle compensating means 1176, a machine coordinate transforming matrix forming means 1177 and a machine coordinate transforming means 1178. As for each of the means 1171–1190, processor of the computer working the NC post processor unit 1130 can be realized also with software.

A NC control mechanism 1140 numerically controls the NC machine 1150. A coordinate system determining tool positions of the NC machine 1150 has basic three axes X, Y, Z which are perpendicular to each other, and axes controlling a tool axis are two axes of rotary axes A, B, C.

Next, an operation of the NC post processor unit 1130 will be explained.

The CL data·machine configuration reading means 1160 reads CL data composed of tool control point vectors (X, Y, Z) and tool axis vectors (I, J, K) and the machine configuration composed of the first rotary axis, second rotary axis, tool axis and master axis, from the CL data file 112.

The component transforming matrix·angle-addition value forming means 1171 forms the component conversion matrix Ma for converting the tool axis vectors (I, J, K) into a normal coordinate system (α1, α2, α3) on the basis of the machine configuration, an axis conversion matrix for converting the tool axis on the normal coordinates into a designated tool axis and angle addition value Δ for changing a reference position at time of angle calculation by the master axis.

FIG. 2 is a chart of corresponding relations of the machine configurations, component transformation matrix Ma, axes transformation matrix Mc and angle addition vales Δ. For example, when the first rotary axis is an A axis, the second rotary axis is a C axis, the tool axis is a Z axis and the master axis is not designated, the component transformation matrix Ma is set so that the normal coordinates (α1, α2, α3) becomes (K, I, −J), the axis transformation matrix is set so that the Z axis becomes the tool axis, and the angle addition value Δ is set with 0.

The component converting means 1172 converts the tool axis vectors (I, J, K) by the component transformation matrix Ma to be the tool axis vectors (α1, α2, α3) on the normal coordinate system, as the following Expression 11:

$$\begin{bmatrix} \alpha_1 \\ \alpha_2 \\ \alpha_3 \\ 1 \end{bmatrix} = [M_a] \begin{bmatrix} I \\ J \\ K \\ 1 \end{bmatrix} \quad \text{Expression 11}$$

The second angle forming means 1173 calculates arctangent from the tool axis vectors (α2, α3) on the normal coordinate system, as in Expression 12. In the case of installation of it into the computer, such computer languages as C++, etc. are used, and a tan 2 function is used for arctangent.

$$\theta_1 = \tan^{-1}\left(\frac{\alpha_2}{\alpha_3}\right), \text{example: } a\tan2(\alpha2, \alpha3) \quad \text{Expression 12}$$

FIG. 3 is a flow chart of compensation procedures for compensating the second angle from angles calculated by the second angle forming means 1173, taking into consideration the limit items on computer installation.

The second angle compensating means 1174 compensates from angles calculated by the second angle forming means 1173, taking into consideration the limit items on the computer installation.

In 0/0 discriminating step 1310, whether or not both of α2 and α3 become 0 is discriminated, and an identifier expressing 0/0 is set to an angle θ1. The identifier sets a value other than the range of −π to π, which is a domain of definition of angle θ1, for example, it sets 99.0 or the like.

In difference value forming step 1320, a difference value of adjacent angles θ1 is calculated. In the case where a start point is an identifier indicating 0/0, the angle at the start point is determined by deleting the next difference value from the next angle. In the case where the first one of adjacent angles is 0/0 identifier, a difference value before that is set. In the case where the second one of adjacent angles is 0/0 identifier, the next difference value is set. Since the angle is set in this manner, there is no case where a change in angle becomes large by the limit of built in function.

In difference value compensation step 1330, whether or not a magnitude of the difference value is larger than π is discriminated, in the case where it is larger than π, five difference values which are that difference value, that difference value +π, that difference value −π, that difference value +2π and that difference value −2π or are formed, and the minimum value of them is set a difference value.

In difference value adding step 1340, finally, an angle is obtained by adding a difference value to the previous angle other than an angle at the start point. Thus, an angle is set so that a change in angle becomes minimum in this manner, so that the change in angle becomes never large.

The first angle forming means 1175 calculates arctangent according to Expression 14 from a component (α4) obtained from the angle compensated by the second angle compensating means 1174 according to Expression 13, and a component (α1) of the tool axis vector on the normal coordinate system. In the case of installation of it into the computer, such computer languages as C++, etc. are used, and a tan 2 function is used for obtaining arctangent.

$$\alpha_4 = \cos(\theta_1) \times \alpha_3 + \sin(\theta_1) \times \alpha_2 \quad \text{Expression 13}$$

$$\theta_2 = \tan^{-1}\left(\frac{\alpha_1}{\alpha_4}\right), \text{example: } a\tan2(\alpha1, \alpha4) \quad \text{Expression 14}$$

The first angle compensating means 1176 compensates an angle obtained by the first angle forming means 1175, taking into consideration the limit items on computer installation.

Figure 4:
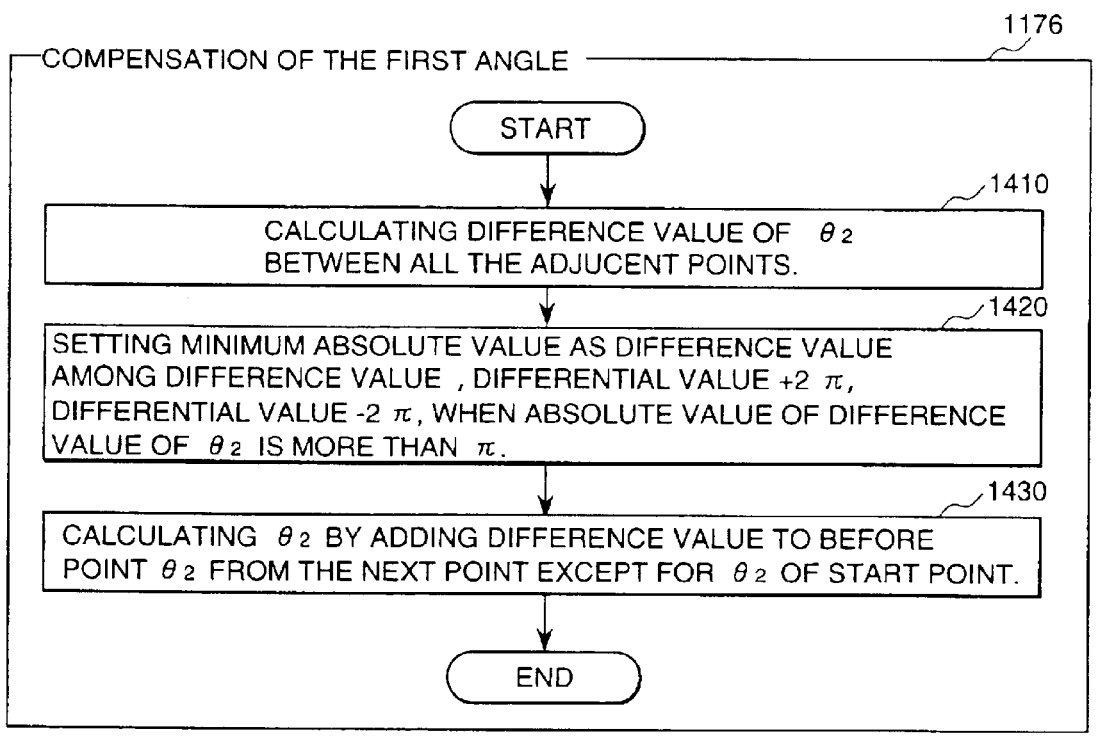
FIG. 4 is a flow chart of compensation procedures for compensating the first angle from angles calculated by a first angle forming means, taking into consideration limit items on computer installation.

FIG. 4 is a flow chart of compensation procedures for compensating the first angle from angles calculated by the first angle forming means 1175, taking into consideration the limit items on computer installation.

In difference value forming step 1410, a difference value of adjacent angles θ2 is calculated.

In difference value compensation step 1420, whether or not a magnitude of the difference value is larger than π is discriminated, in the case where it is larger than π, three difference values which are that difference value, that difference value +2π and that difference value −2π are formed, and the minimum value of them is set a difference value.

In difference value adding step 1430, an angle is obtained by adding an angle addition value Δ to the second angle at start point, and adding the difference value to the previous angle. Thus, the angle is set so that a change in angle becomes minimum in this manner, so that the change in angle becomes never large.

The machine coordinate transforming matrix forming means 1177 forms machine coordinate transforming matrix Mb, M1, M2 shown by Expression 15, from the first angle and the second angle.

In the Expression 15, Mx, My, Mz are X, Y, Z coordinate values of the NC machine 1150, and express coordinate values after conversion to the machine coordinates. X, Y, Z are tool control point vectors on the workpiece coordinate system.

The matrix Mb has, as shown in Expression 16, the component conversion matrix Ma as a rotary component and a matrix Ms which has, as moving components, position vectors (Xs, Ys, Zs) of the origin of a workpiece coordinate system, viewed from the machine coordinate system origin which is a cross point at which a first axis rotation center line and a second axis rotation center line of the machine cross at right angles.

The matrix M1 is a rotary matrix when rotating at a first rotary axis as shown by Expression 17, the matrix M2 is a rotary matrix when rotating at the second axis as shown by Expression 18, and the matrix Mc is an axis converting matrix when causing the tool axis on the normal coordinate system to meet with the tool axis indicated by the machine configuration.

$$\begin{bmatrix} M_X \\ M_Y \\ M_Z \\ 1 \end{bmatrix} = [M_c][M_2][M_1][M_b] \begin{bmatrix} X \\ Y \\ Z \\ 1 \end{bmatrix} \quad \text{Expression 15}$$

$$[M_b] = [M_a] + [M_s] \quad \text{Expression 16}$$

$$[M_s] = \begin{bmatrix} 0 & 0 & 0 & X_s \\ 0 & 0 & 0 & Y_s \\ 0 & 0 & 0 & Z_s \\ 0 & 0 & 0 & 1 \end{bmatrix}$$

$$[M_1] = \begin{bmatrix} 1 & 0 & 0 & 0 \\ 0 & \cos(\theta_1) & -\sin(\theta_1) & 0 \\ 0 & \sin(\theta_1) & \cos(\theta_1) & 0 \\ 0 & 0 & 0 & 1 \end{bmatrix} \quad \text{Expression 17}$$

$$[M_2] = \begin{bmatrix} \sin(\theta_2) & 0 & \cos(\theta_2) & 0 \\ 0 & 1 & 0 & 0 \\ -\cos(\theta_2) & 0 & \sin(\theta_2) & 0 \\ 0 & 0 & 0 & 1 \end{bmatrix} \quad \text{Expression 18}$$

The machine coordinate converting means 1178 converts the tool control point vectors on the workpiece coordinate system into coordinate values on the machine coordinate system according to Expression 15, using the machine coordinate transforming matrix Mb, M1, M2.

The NC data converting means 1180 converts the coordinate values and angle on the machine coordinate system into NC data type.

The NC data transmitting means 1190 transmits the converted NC data to the NC control mechanism 1140.

The NC control mechanism 1140 interprets the transmitted NC data and transmits a moving instruction value for each axis to the NC machine 1150.

Figure 15A:
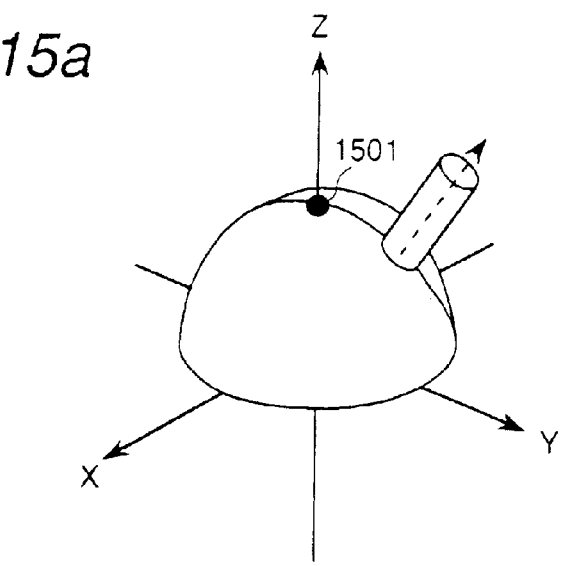
FIGS. 15a, 15b and 15c are diagrams showing a defect due to 0/0 on computer installation.
Figure 15B:
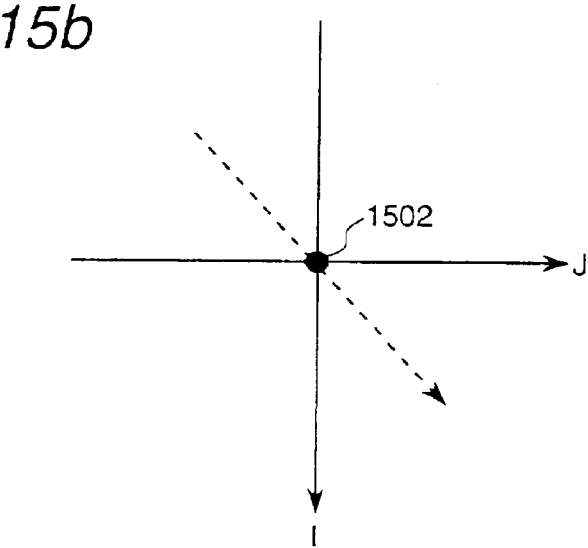
Figure 15C:
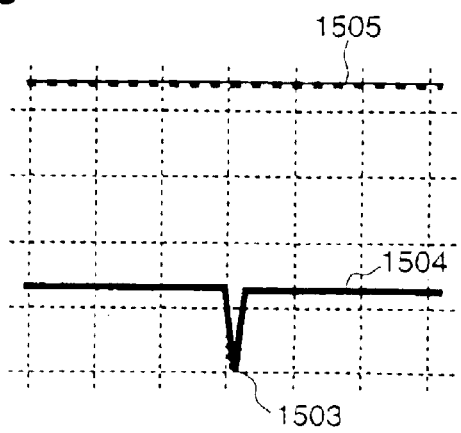
Figure 16A:
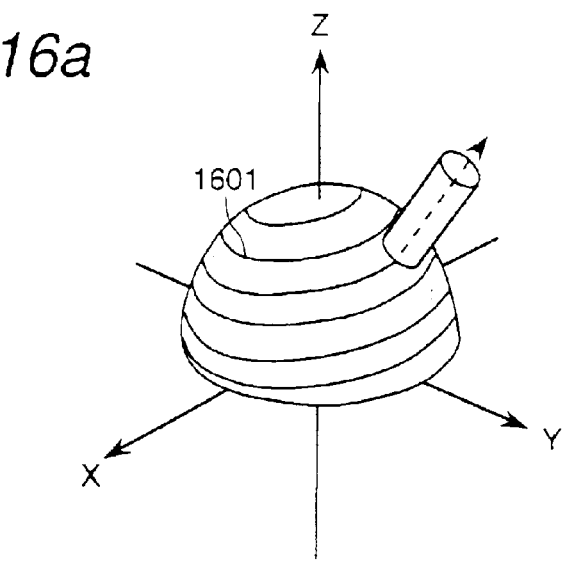
FIGS. 16a, 16b and 16c are diagrams showing a defect due to an answer change limit $-\pi$ radian to $\pi$ radian on computer installation.
Figure 16B:
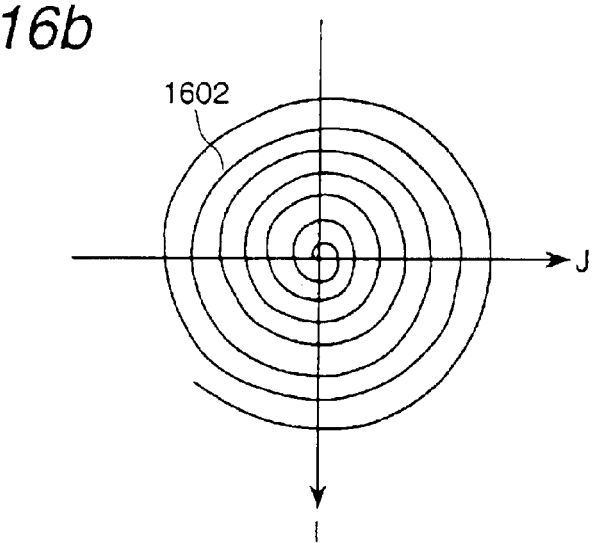
Figure 16C:
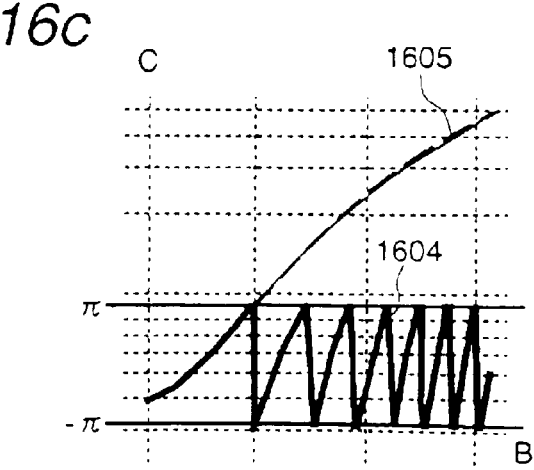
Figure 17A:
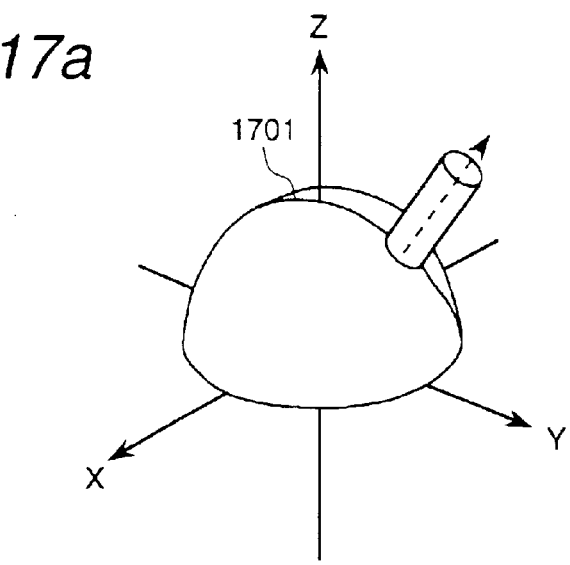
FIGS. 17a, 17b and 17c are diagrams showing a defect due to reversion of vector components.
Figure 17B:
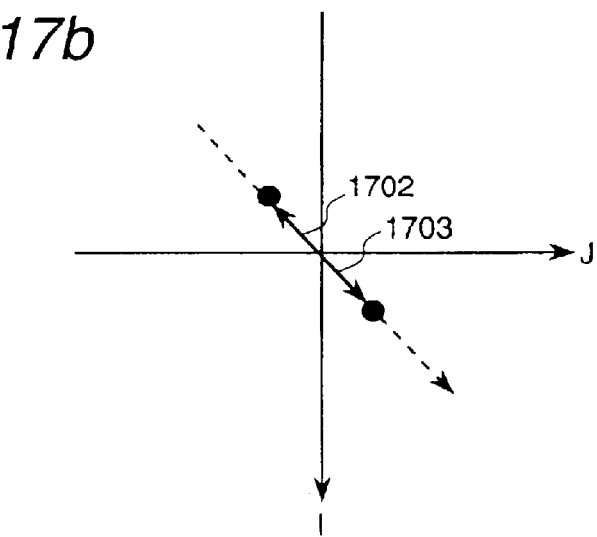
Figure 17C:
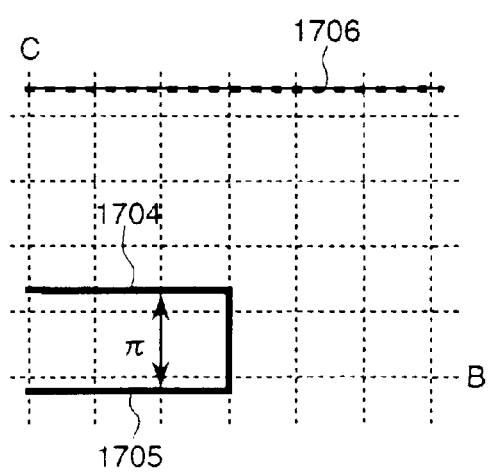

In this manner, the second angle compensating means 1174 compensates the angle which is formed by the second angle forming means 1173 and has a limit and the first angle compensating means 1176 compensates the angle which is formed by the first angle forming means 1175 and has a limit, so that good angle distributions 1505, 1605, 1706 as shown in FIGS. 15c, 16c and 17c can be formed.

As a result, when machining by the NC machine 1150, the phenomena that each axis rapidly rotates at a high speed and the tool moves to unintended positions can be prevented, so that it is possible to perform such machining that tool breakage, machine breakage, too much cutting and too less cutting are less.

Embodiment 2

Figure 5:
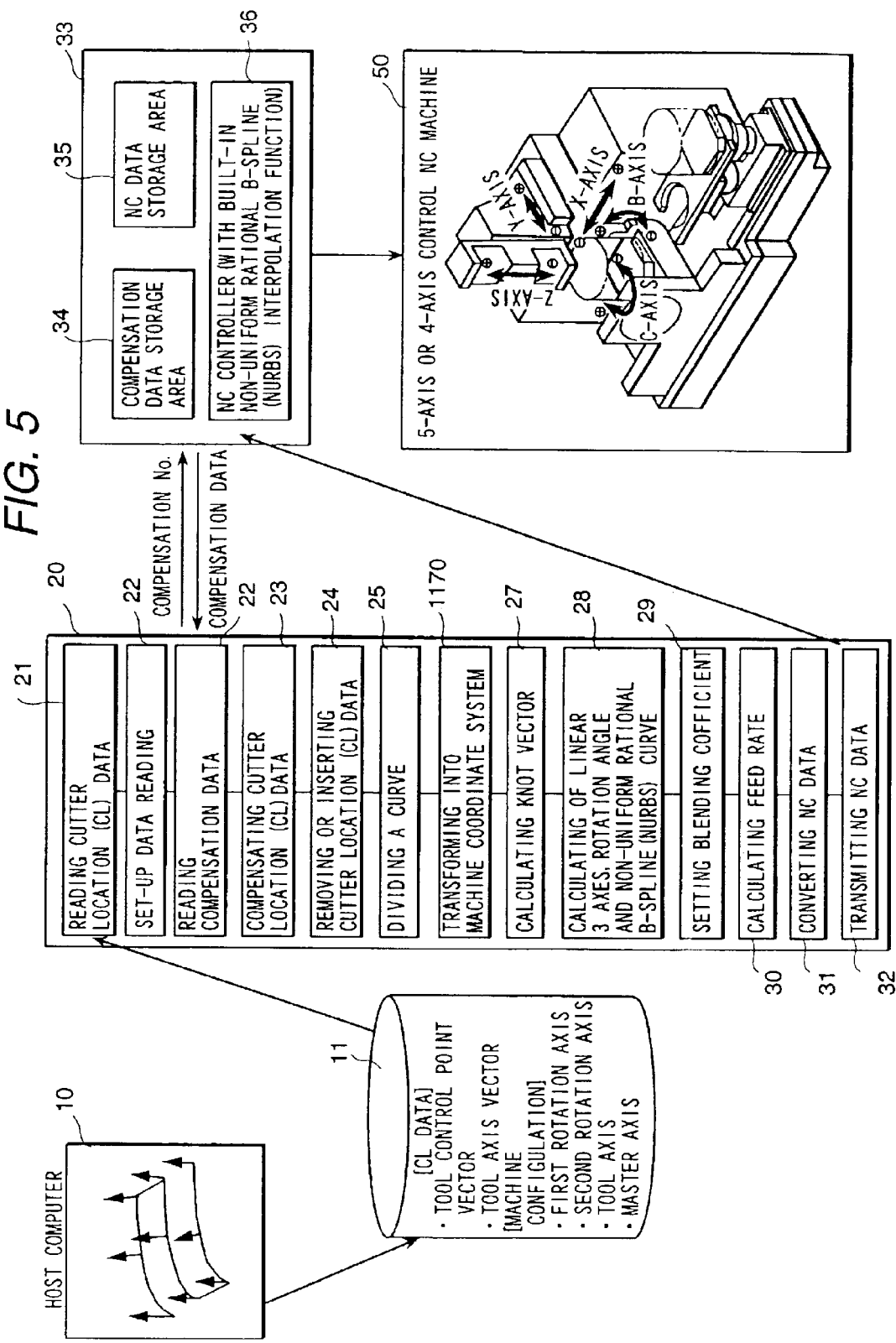
FIG. 5 is a block diagram showing the system configuration of a second embodiment of a numerically controlled curved surface machining unit according to the present invention.

FIG. 5 is a block diagram showing a system configuration of a second embodiment of a numerically controlled curved surface machining unit according to the present invention.

The second embodiment is an embodiment in which the machine coordinate converting means of the numerically controlled curved-surface machining unit described in the previously mentioned US application or JP 2001-92516 is replaced by the coordinate converting means 1170 inside the post processor unit 1130 in FIG. 1.

Since the coordinate converting means 1170 can avoid a rapid change in angle by limit on computer installation, in the second embodiment also it is possible to prevent the phenomenon that each axis rapidly rotates at a high speed and the phenomenon that a tool moves to an unintended position and to perform such machining that tool breakage, machine breakage, too much cutting and too less cutting are less.

As for the means 1171 to 1190 of the machine coordinate converting means 1170 in the second embodiment, computer processing for operating the NC post processor unit 20 is realized as steps of software processing.

The host computer 10 stores, into an external file 11 as CL data, the tool control point vectors and spindle direction vectors calculated along a machining path direction on the workpiece coordinate system on which a curved-surface shape is defined. Curved-surface data calculated by the host computer 10 are divided as a plurality of straight lines within a fixed allowable value, along a tool moving path displayed on the workpiece coordinate system. The CL data 11 is formed by describing tool control points, tool axis vectors and workpiece coordinate system feed rates at respective formed division points in order of the tool moving path.

In step 21, the formed CL data 11 is read into the NC post processor unit 20 to convert the data into NC data for driving the numerically controlled curved-surface machining unit on the basis of the configuration of the numerically controlled curved-surface machining unit 50 are calculated.

In steps 22 to 1170, position vectors of three axes and rotation angles based on the machine configuration of the numerically controlled curved-surface machining unit 50.

In step 22, the NC post processor unit 20 designates tool compensation Nos. and requires output of the compensation data to the NC controller 33 in order to compensate errors between the tool length and diameter which are estimated when NC data are formed and the real tool length and diameter. The NC controller 33 reads the compensation data corresponding to the designated compensation Nos. from the compensation data storage area 34, and output to the NC post processor unit 20. The NC post processor unit 20 reads the compensation data outputted from the NC controller 33.

In step 23, the NC processor unit 20 compensates CL data according to the direction desired to compensate.

In step 24, thinning out or addition of CL data is performed in order to reduce an amount of data while improving the machining accuracy.

In step 25, the NURBS curve calculated in step 24 is divided. Path division positions are obtained from the NURBS curve of the tool control point vectors and a sharply bent tool path. When distances between passing points become rapidly short and an angle of the sharply bent line rapidly changes, disturbance occurs in the NURBS curve. Therefore, the positions that the distance intervals become short and the angle of sharply bent line changes greatly are found, the positions are made as path division points, and the curve is divided at those positions, whereby the accuracy of the curve is improved.

In step 1170, the CL data are converted into a machine coordinate system as explained in the first embodiment.

In step 27, knot vectors are calculated.

In step 28, NURBS curves of Expression 1, Expression 2 and Expression 3 are formed from data of sequence of points of three linear axes (straight line axes) and two rotary axes converted into the machine coordinate system from the CL data on the workpiece coordinate system.

In step 29, a blending coefficient is calculated. Chord lengths of the tool control point vectors of the workpiece coordinate system are calculated, including points 92 thinned out in step 24 thereby to raise the precision, to make them be knot vectors of the workpiece coordinate system.

In step 30, feed rates on the machine coordinate system are calculated.

In step 31, control points of NURBS curve of three linear axes calculated in steps 28, 29 and 30 are converted to NC data according to an instruction format of NURBS interpolation.

In step 32, the NC data finally converted are transmitted as NC data from the NC post processor unit 20, and read and stored in the NC data storage area 35 of the NC controller 33.

The NC control mechanism 36 in which NURBS interpolation function of the NC controller 33 is built in reads out NC data form the NC data storage area 35, and controls the 5-axis or 4-axis control NC machine 50 while analyzing them to perform NC machining.

Figure 6:
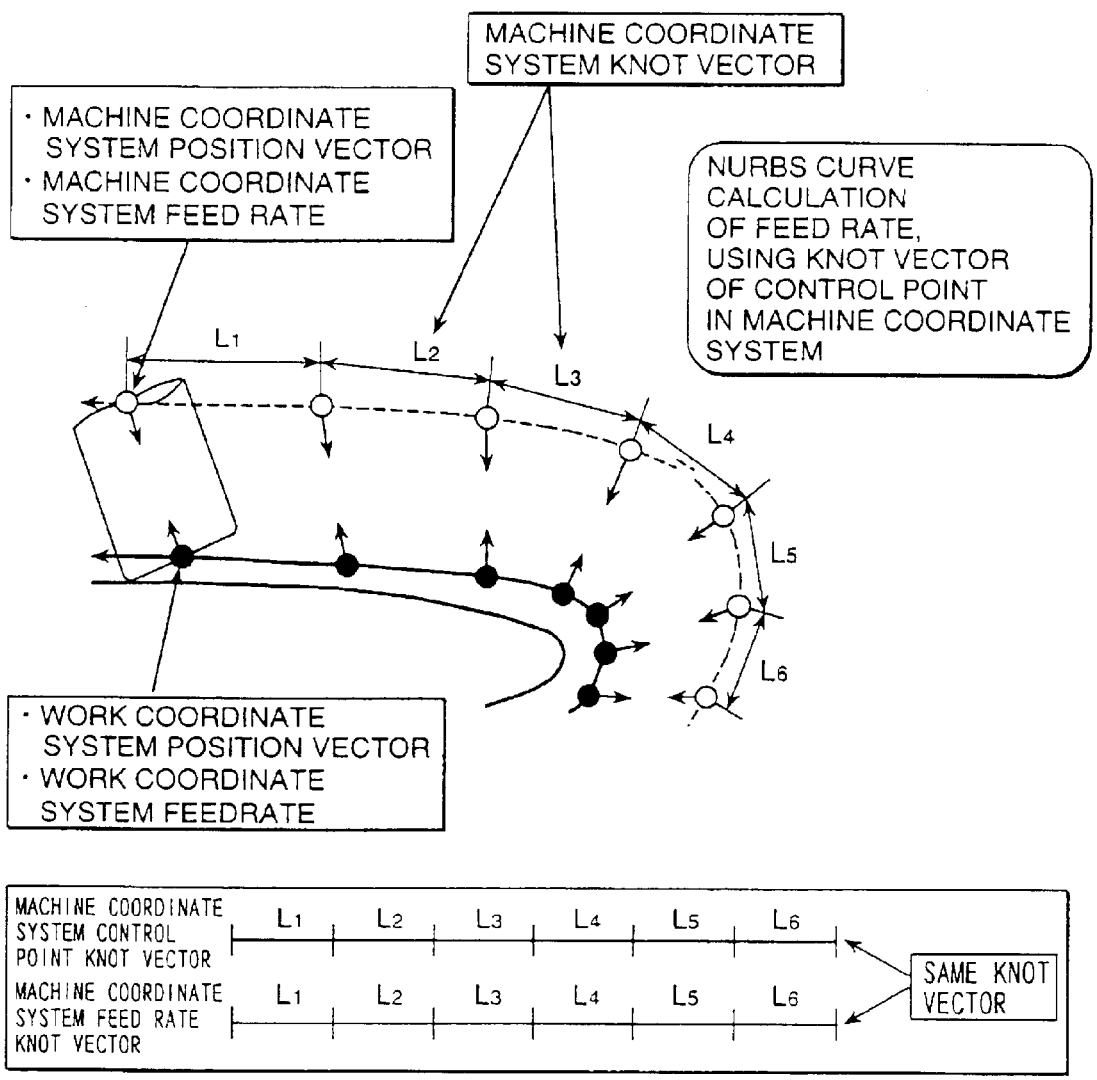
FIG. 6 is a diagram showing how to define a knot vector in the NURBS curve interpolation of feed rate.

FIG. 6 shows a way of setting knot vectors.

Knot vectors of a NURBS curve on the machine coordinate system are derived on the basis of the procedure of obtaining knot vectors by blending the behavior of tool control point and the behavior of the machine coordinate system shown in FIG. 6, as in the U.S. patent application Ser. No 10/437,279, JP 2001-92516A or JP 2002-222048A.

In the U.S. patent application Ser. No 10/437,279 (JP 2001-92516A), it has been considered to divide into segments corresponding to a rapid change in bending at the tool control point, however, segment division relating to rapid bending change on the machine coordinate system and a filet inserting method have not been considered. Therefore, there has been the possibility that waviness and strain in machined surface due to bending movement on the machine coordinate axes, which can not be found by only the behavior of the tool control point.

Figure 7:
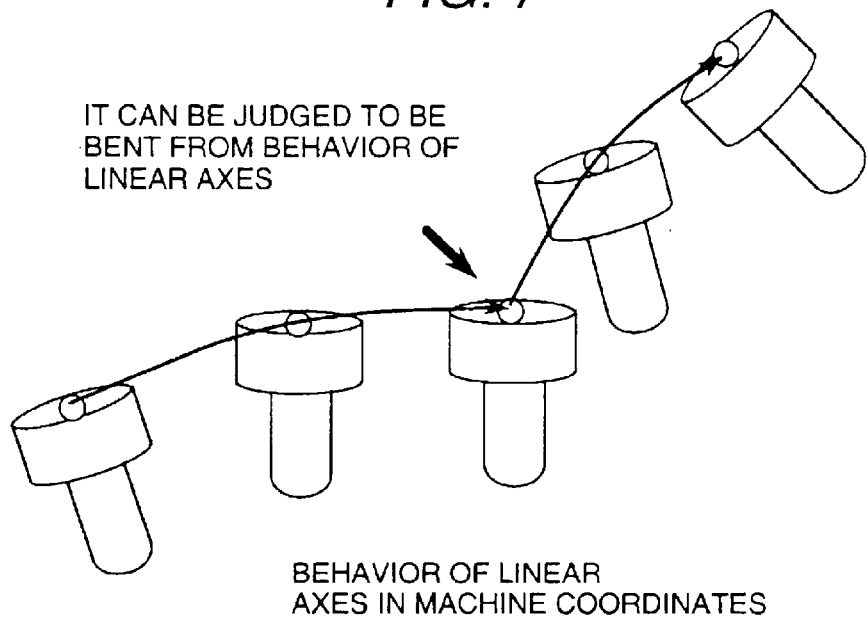
FIG. 7 is a diagram showing behavior of machine coordinate linear axes.
Figure 8:
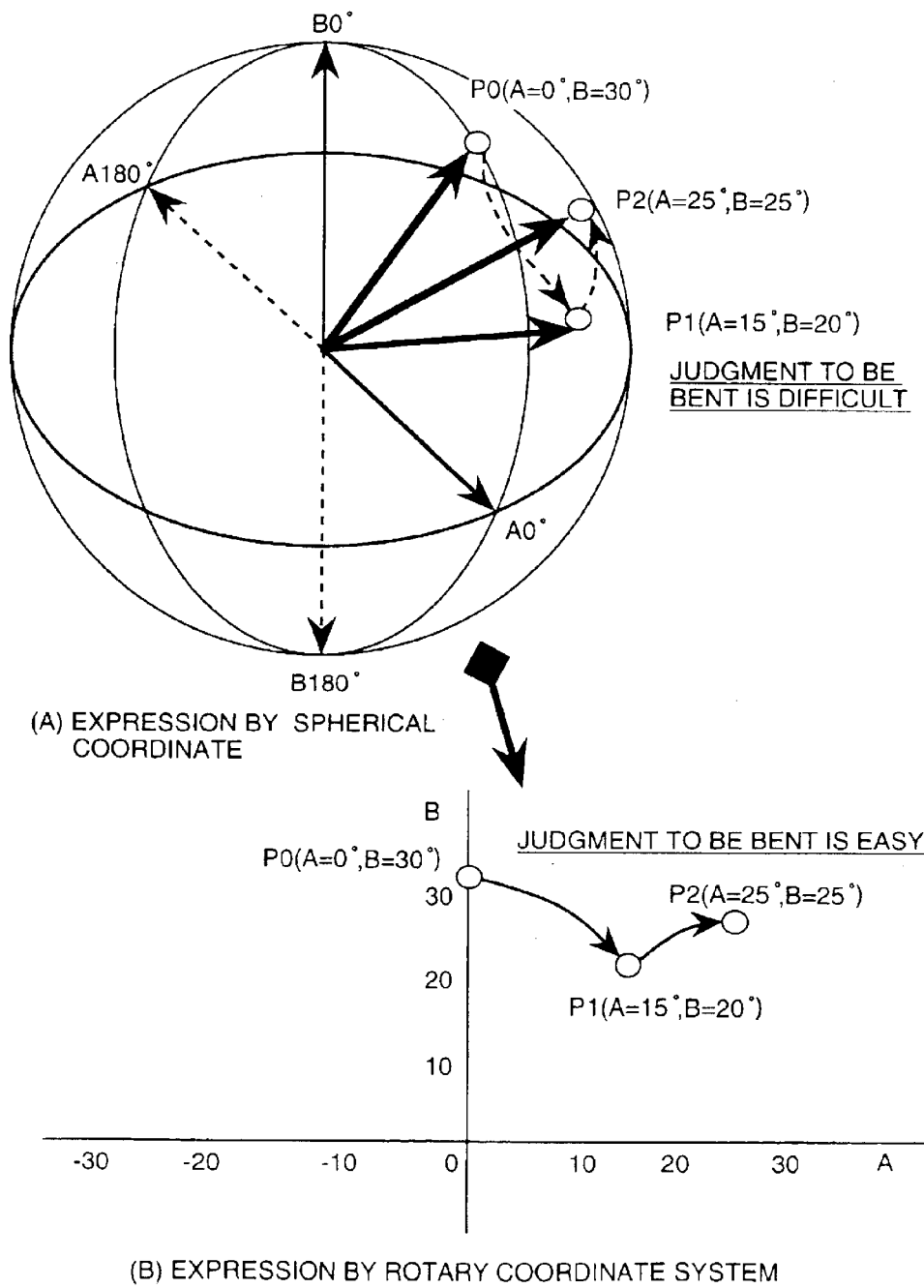
FIG. 8 is a diagram showing a way of converting a spherical coordinate system in the machine coordinate system into a rotary coordinate system.
Figure 10:
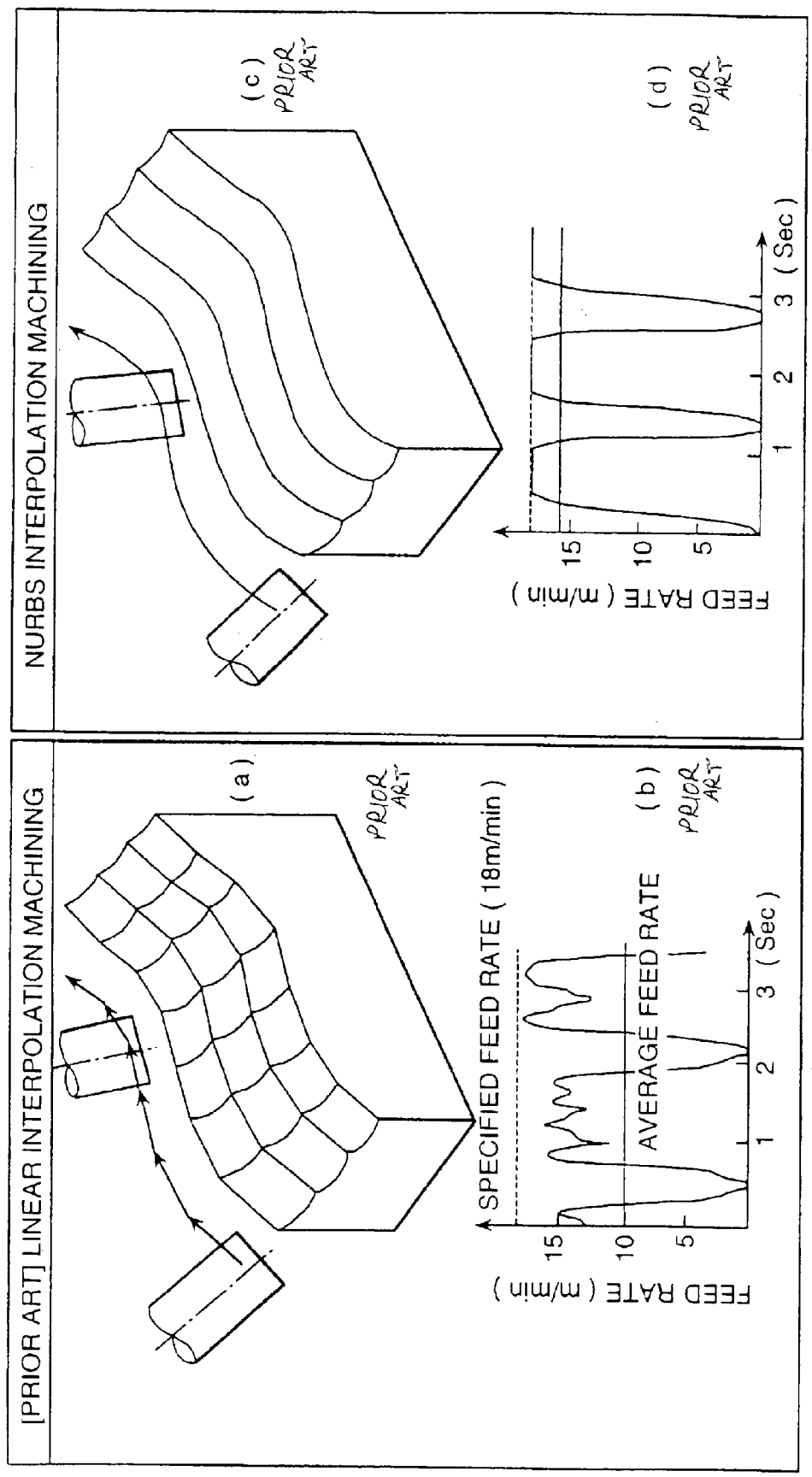
FIG. 10 is a diagram showing comparison of conventional linear interpolation machining and conventional NURBS interpolation machining.
Figure 11:
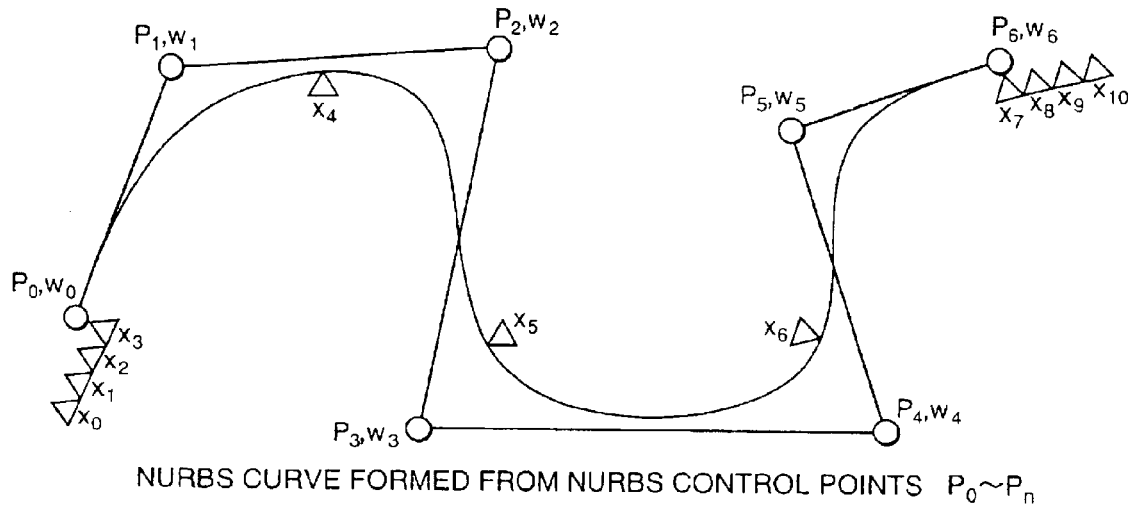
FIG. 11 is a diagram showing the relationship between NURBS curve and control points.

On the contrary, in the present embodiment, as shown in FIG. 7 and FIG. 8, the machining accuracy is improved by making it possible to consider about the behavior on the machine coordinate axes.

FIG. 7 shows behavior of linear coordinate axes of the machine coordinate system.

A sharp bend in the behavior can be understood as curve movement on a XYZ space in the same manner as the time of behavior of the tool control point. However, usually, it is very difficult to understand the movement of a rotary coordinate axis as such a movement of the curve.

FIG. 8 is a diagram showing a way of converting a spherical coordinate system in the machine coordinate system into a rotary coordinate system.

In the second embodiment, the behavior of the spherical coordinate axis is taken up by mapping as shown in FIG. 8(A). Usually, when the behavior of the rotary axis is expressed by noticing on only a rotating movement, the expression becomes such an expression as a globe as shown in FIG. 8(A). At this time, for example, an A-axis and a B-axis which are of the spherical coordinate system are applied to the longitude and latitude, respectively.

In this expression, it is very difficult to judge whether or not there is a sharp bend in movement of P0, P1, P2 which are a locus in the rotary axis direction.

Here, the behavior is analyzed by mapping the locus in the rotary axis direction on a two-dimensional plane as shown in FIG. 8(B). For example, a rotation angle of the A axis is applied on a horizontal axis (an abscissa) and a rotation angle of the B axis is applied on a vertical axis (an ordinate).

Thereby, the movement of P0, P1, p2 which are of the locus in the rotation direction can be taken as the same movement as expressed on a usual two-dimensional plane, and occurrence of a sharp bend at the position P1 can be found independently of the behavior on the linear coordinate axes and the behavior of the tool control point.

In step 28, NURBS curve on the machine coordinate system of each of a rotation angle axis and linear three axes is calculated. By using the procedure in FIG. 8(B), it also is possible to insert a segment division position based on the behavior on the rotary coordinate system in addition to judgment of the segment division position based on the conventional tool control point behavior and the behavior of machine coordinate system linear axes.

The rotation angles 2-dimensionally mapped of FIG. 8(B) are not limited to such a range as −180° to 180°, but they can be expressed beyond the range. For example, in the case where the next position to a position of 170° is 10°, when the range is limited to −180° to 180°, it should be returned by 190° like 170°→0°→10°. By expressing the next position 10° as 190°, it can be achieved by advance of 20° like 170°→190°, and the moving direction can be expressed by a minimum distance in a manner similar to the expression in a usual globe.

Figure 9:
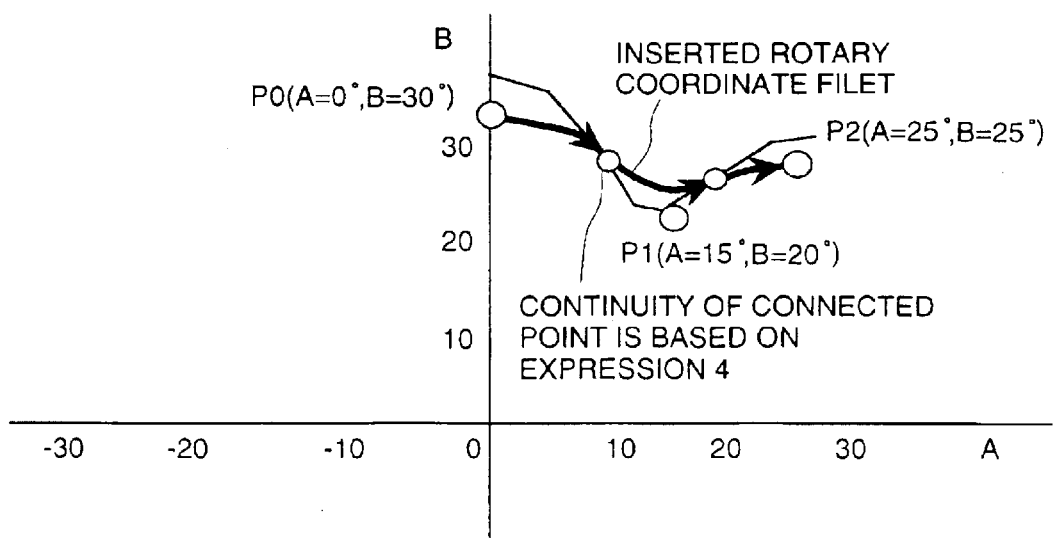
FIG. 9 is a diagram showing a way of filet insertion of a rotary coordinate angle replaced into a rotary coordinate system.

FIG. 9 is a diagram showing a way of filet insertion of a rotary coordinate angle replaced into the linear coordinate system.

Figure 12:
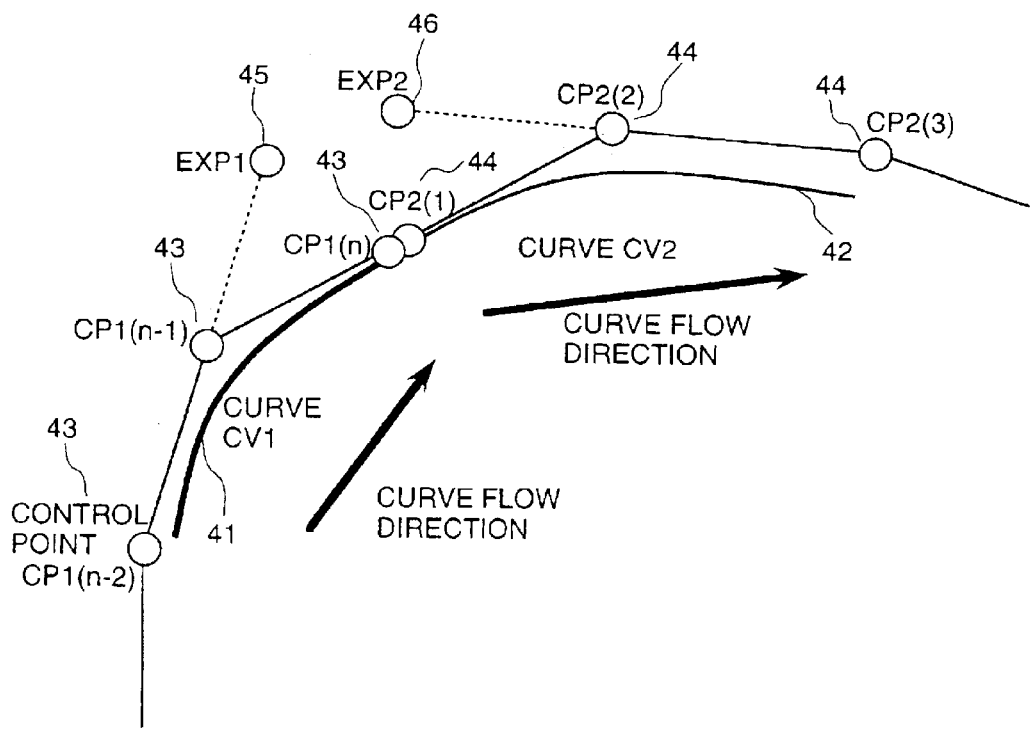
FIG. 12 is a diagram showing the relationship between two NURBS curves around a connection portion thereof.
Figure 14:
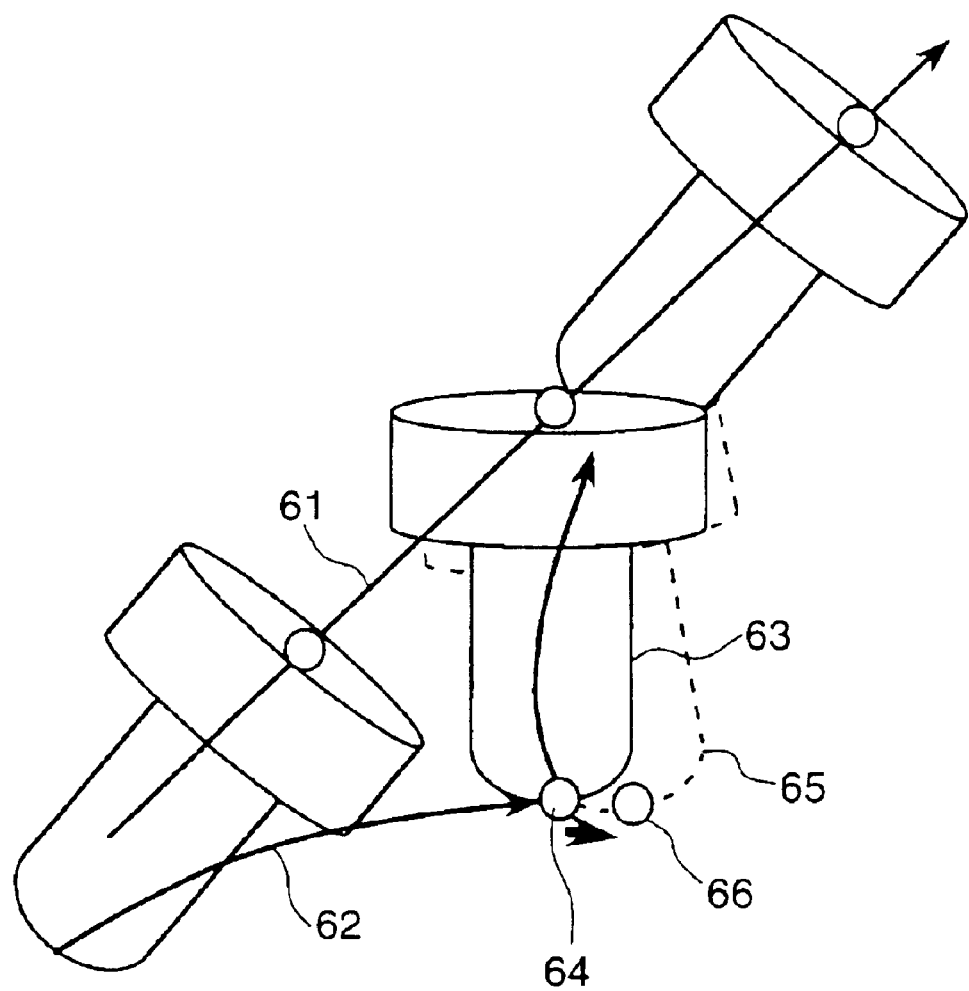
FIG. 14 is a diagram showing cutting of a tool into a material to be machined at a position at which a rotation angle changes rapidly.

By using this 2-dimensional mapping, it also is possible to form it as in filet insertion in a usual 2-dimentional curve, as shown in FIG. 9. It is also possible to adapt the expression 10 and the procedure shown in FIG. 12 for securing the continuity on the connection conditions at this time.

After that, until step 32 from step 29, an NC data instruction by NURBS curve on the machine coordinates is formed and transmitted to the NC controller 33.

The NC control mechanism 36 having a NURBS interpolation function of the NC controller 33 built therein reads out NC data from the NC data storage area 35, controls the 5-axes or 4-axes control NC machine 50 while analyzing the NC data, and performs NC machining.

The present invention, when a NC data output format is provided by general free curve, can be applied to the case of deriving values of X, Y, Z which are control points of linear 3-axis free curve on the machine coordinate system, values of α, β which are control points of the free curve of rotary 2-axes, knot vector K, weight R and F which is a control point of the free curve feed rate on the machine coordinate system, by the similar process to the above-mentioned process as a interpolation method of the above-mentioned tool position vector and feed rate, and converting them to NC data to perform NC machining.

As a method of controlling behavior of a machine, the present invention can be applied to not only a case of controlling at a machine center position but a case of controlling at a tool control point.

As an interpolation method of a tool control point moving locus or path, it can be installed with a function of using not only NURBS curve but, in the case of using a free curve, equivalent free curve and parameters thereof as a rotation angle interpolation method.

When free curve interpolation is performed using, as control points, rotation angles converted into a machine coordinated system, changing a tool axis rotation angle which can be a control point, and addition and/or thinning out of control points of tool axis rotation angle can be flexibly performed.

What is claimed is:

1. A numerically controlled curved-surface machining unit equipped with three linearly moving axes and, at least, one rotary axis, including a simultaneous multiple-axis control NC machine numerically controlled by a numerical control unit with a numerical control NURBS interpolation function, comprising:

component converting matrix-angle-addition value forming means for converting CL (cutter location) data composed of tool control point vector data and tool axis vector data, calculated along a machining direction on a workpiece coordinate system on which a curved surface is defined by a host computer into components on a normal coordinate system for operating said simultaneous multiple-axis control NC machine on the basis of the machine configuration of said simultaneous multiple-axis control NC machine;

component converting means for converting from the workpiece coordinate system to the normal coordinate system;

second angle forming means for forming second angles of a second rotary axis on the normal coordinate system;

second angle compensating means for forming a continuous angle distribution from a distribution of the second angles;

first angle forming means for forming first angles of a first rotary axes on a coordinate system rotated by the second angles at the second rotary axis;

first angle compensating means for forming a continuous angle distribution from a distribution of the first angles;

machine coordinate transformation matrix forming means for obtaining a matrix for converting the tool control point vectors on the workpiece coordinate system into a machine coordinate system by using said first angles and said second angles;

machine coordinate converting means for converting the tool control point vectors into the machine coordinate system by using said machine coordinate transforming matrix;

means for converting data on the machine coordinate system to NC data; and means for transmitting said NC data to said numerical control unit.

2. A numerically controlled curved-surface machining unit according to claim 1, wherein said component converting matrix·angle addition value forming means reads, as said machine configuration, data relating to the first rotary axis, the second rotary axis, a tool axis and a master axis and forms a component converting matrix converting components to the normal coordinate system, axis conversion matrix and angle addition values, and said component converting means converts the tool axis vectors into normal coordinate system components by using the component converting matrix, the axis converting matrix and the angle addition values.

3. A numerically controlled curved-surface machining unit according to claim 1, wherein said second angle compensating means sets an identifier by detecting the condition that both vectors for obtaining angles become 0, obtains a difference value of adjacent angles, forms another difference value using the difference value of adjacent angles in the case where any angle is not obtained by said identifier, detect, when said difference value is larger than $\pi$, a minimum value from said difference value, said difference value $+\pi$, said difference value $-\pi$, said difference value $+2\pi$, and said difference value $-2\pi$ to set the minimum difference value as a new difference value, and obtains the second angle by adding the difference value to an angle of a start point.

4. A numerically controlled curved-surface machining unit according to claim 3, wherein said first angle compensating means detects, when said difference value is larger than $\pi$, a minimum value from said difference value, said difference value $+2\pi$ and said difference value $-2\pi$ to set the minimum difference value as a new difference value, and obtains the first angle by adding the difference value to the angle of start point.

5. A numerically controlled curved-surface machining unit according to any one of claims 1 to 4, wherein said first angle forming means forms a reference direction vector of said first angle by using said second angle, and obtains the first angle the start of which is said reference vector.

* * * * *